(12) United States Patent
Zamuner

(10) Patent No.: US 7,446,280 B2
(45) Date of Patent: Nov. 4, 2008

(54) ERGONOMIC HANDLE ATTACHMENT WITH ADJUSTMENT FEATURE

(75) Inventor: Frank Zamuner, Oakville (CA)

(73) Assignee: Lincoln Global, Inc., City of Industry, CA (US)

( * ) Notice: Subject to any disclaimer, the term of this patent is extended or adjusted under 35 U.S.C. 154(b) by 24 days.

(21) Appl. No.: 11/234,608

(22) Filed: Sep. 23, 2005

(65) Prior Publication Data

US 2007/0068912 A1    Mar. 29, 2007

(51) Int. Cl.
    *B23K 9/00*    (2006.01)
(52) U.S. Cl. ................... 219/137.31; 219/144
(58) Field of Classification Search ............ 219/137.31, 219/144; 16/430; 81/489
    See application file for complete search history.

(56) References Cited

U.S. PATENT DOCUMENTS

| | | | |
|---|---|---|---|
| 2,217,100 A | 10/1940 | Burns | |
| 3,203,697 A | 8/1965 | Berzatzy | |
| 3,410,016 A | 11/1968 | Arsenault | |
| 3,980,860 A | 9/1976 | Howell et al. | |
| 4,711,538 A | 12/1987 | Ohs et al. | |
| 5,079,404 A | 1/1992 | Zamuner | |
| 5,195,164 A * | 3/1993 | Lambert | 392/385 |
| 5,313,046 A | 5/1994 | Zamuner | |
| 5,548,869 A * | 8/1996 | Ryczek | 16/93 R |
| 6,610,963 B2 * | 8/2003 | Zamuner | 219/137.31 |
| 6,940,041 B2 | 9/2005 | Zamuner | |
| 7,342,199 B2 * | 3/2008 | Zamuner | 219/137.31 |
| 2004/0031781 A1 | 2/2004 | Zamuner | |
| 2006/0226135 A1 * | 10/2006 | Zamuner | 219/137.31 |

FOREIGN PATENT DOCUMENTS

| | | |
|---|---|---|
| CA | 2053131 | 4/1992 |
| CA | 2106837 | 3/1994 |
| CA | 2139152 | 7/1995 |
| CA | 2338949 | 8/2004 |
| EP | 0 590 728 A1 | 6/1994 |
| GB | 2 214 598 A | 6/1989 |
| GB | 2 285 404 A | 12/1995 |

OTHER PUBLICATIONS

International Search Report for International Application No. PCT/US06/05360, completed Mar. 28, 2007.

* cited by examiner

*Primary Examiner*—Kevin P Kerns
(74) *Attorney, Agent, or Firm*—Fay Sharpe LLP

(57) ABSTRACT

An ergonomic handle attachment to be used with a welding torch handle, the attachment has an attachment portion which is selectively attached to a wall of the handle; a hand grip portion which is selectively attached to the attachment portion, and, a locking member extending from the hand grip portion which is slidably received within an opening of the attachment portion.

6 Claims, 8 Drawing Sheets

ERGONOMIC HANDLE ATTACHMENT WITH ADJUSTMENT FEATURE

INCORPORATION BY REFERENCE

This application relates to welding torches having handles intended to be held manually during use, such as disclosed in U.S. Pat. No. 6,610,963 which is hereby totally incorporated by reference herein, and Published Application No. US 2004/0031781 which is also hereby totally incorporated by reference herein.

BACKGROUND

The present exemplary embodiment relates to welding torches of the kind that are used by welders in industry, where the torch is intended to be held in the hand of the welder for hours at a stretch. It is all too often the case that the welder develops painful symptoms, or at least fatigue, in the hand and wrist, from holding the torch. It is not so much that the torch is heavy in itself, but the problem is that the torch has a hose or pipe connecting it to the welding service center, and the hose can impose a constant drag on the torch, making the torch cumbersome and difficult to manipulate.

It is part of the welding torch operator's task to hold the torch, in his hand, perhaps for hours. The service hose of the torch contains the electricity supply, the consumable welding wire, the inert-gas supply, the cooling water circulation conduits, and perhaps a vacuum suction hose for extracting the fumes, which, even to the habitual expert welder, can make the torch seem extremely heavy after a while.

One of the problems is that the welder must grip the torch handle in his hand, and must grip it quite tightly, in order to manipulate the torch and hose, and to hold the torch in position. Plus, it is in the nature of welding that the grip must be maintained at all times: the torch cannot be held steady, by resting the torch against something. It is also recognized that much of the fatigue of the hands experienced by welders arises rather from the need to maintain a tight gripping hold on the torch, using the fingers of the torch hand, in order to maintain the correct orientation of the torch, than from actually moving and positioning the torch, using the wrist.

Previous attempts to make it easier to grip the torch handle have been in the areas of making the handle curved to better fit the natural shape of the hand, or of having recessed finger grips molded into the (plastic) handle. However, many of these attempts do not make the handle adjustable for various sizes and shapes of hands.

Thus, it is desirable to provide an ergonomic handle attachment which is adjustable to accommodate various shapes and sizes of hands and various gripping positions of hands.

SUMMARY OF THE INVENTION

The present invention is directed to handle attachments for welding torches, in particular an over-handle to be used with a welding torch handle. That is, the present invention is aimed at taking away the need for the welder to grip the torch handle. The invention provides an over-handle attachment, which enables the welder to slide the first web area of his hand, i.e. the web area between the thumb and forefinger, into the space between the torch handle and the over-handle, and the over-handle is so designed that this space receives the first web area, and (slightly) squeezes the first web area. In the conventional torch handle, the welder's hand and the torch could only be integrated into a manipulative whole unit when the welder gripped the handle tightly; with the handle attachment of the invention, the welder's hand and the torch can form an integrated manipulative unit without the need for the welder to grip the torch handle.

Of course, many different types of articles are adapted to be held in the hand, and to be manipulated by a person. Handles and grips have been designed for all kinds of specialized functions. The present invention is aimed specifically at making it possible for a welder to complete a long period of work without hand-fatigue, recognizing that the major cause of hand fatigue in welders has been the constant drag of the hose that connects the torch to the service center. The welder not only has to support the weight of the torch, but the presence of the hose means that the welder also has to exert a forceful grip on the torch, to maintain the torch in its correct orientation, against the constant drag or pull of the hose, and it is this latter requirement that is mainly responsible for the fatigue.

It might be considered that one way in which the welder's hand might be attached to the torch, without the need for the welder to grip the torch, would be for the torch to be strapped to the welder's hand. However, this would not be advisable. The welder must be able to set the torch down, and withdraw his hand, with a minimum of impediment from the torch itself. The handle attachment as described herein is aimed at creating a firm, secure, unity of the welder's hand with the torch, and yet is aimed at making it possible for the welder to easily release the torch immediately from his hand, should the occasion arise. Furthermore, the handle attachment is adjustable to accommodate various sizes and shapes of hands by having a slidable locking arrangement which allows the over-handle to move in a longitudinal direction with respect to the torch handle.

Thus, according to one aspect of the invention, an ergonomic handle attachment is used with a welding torch handle. The attachment has an attachment portion which is selectively attached to a wall of the handle; a hand grip portion which is selectively attached to the attachment portion; and a locking member which extends from the hand grip portion and is slidably received within an opening of the attachment portion.

In accordance with another aspect of the invention an ergonomic over-handle attachment is provided in combination with a welding torch handle. The over-handle attachment has an attachment member attached to the torch handle at a front portion of the torch handle; a hand-grip member extends rearwardly from the attachment member; and a locking arrangement for the attachment member. The locking arrangement has a wall with serrated edges thereon which matingly engage corresponding serrated edges on opposing walls of the attachment member.

In accordance with yet another aspect of the invention, a method of adjusting an over-handle for a handle for a welding torch includes positioning a first attachment member to the handle adjacent a first side wall of the handle, and positioning a second attachment member to the handle adjacent a second side wall of the handle opposite the first side wall. A locking member is inserted through an opening formed between the first and second attachment members. The first and second attachment members are pushed toward each other until they contact the locking member. The first and second attachment members are secured to the handle via fasteners.

Still other aspects of the invention will become apparent from the following description taken together with the accompanying drawings.

BRIEF DESCRIPTION OF THE DRAWINGS

By way of further explanation of the invention, exemplary embodiments of the invention will now be described with reference to the accompanying drawings, in which.

DETAILED DESCRIPTION

The apparatuses shown in the accompanying drawings and described below are examples which embody the invention. It should be noted that the scope of the invention is defined by the accompanying claims, and not necessarily by specific features of exemplary embodiments.

Figure 1:
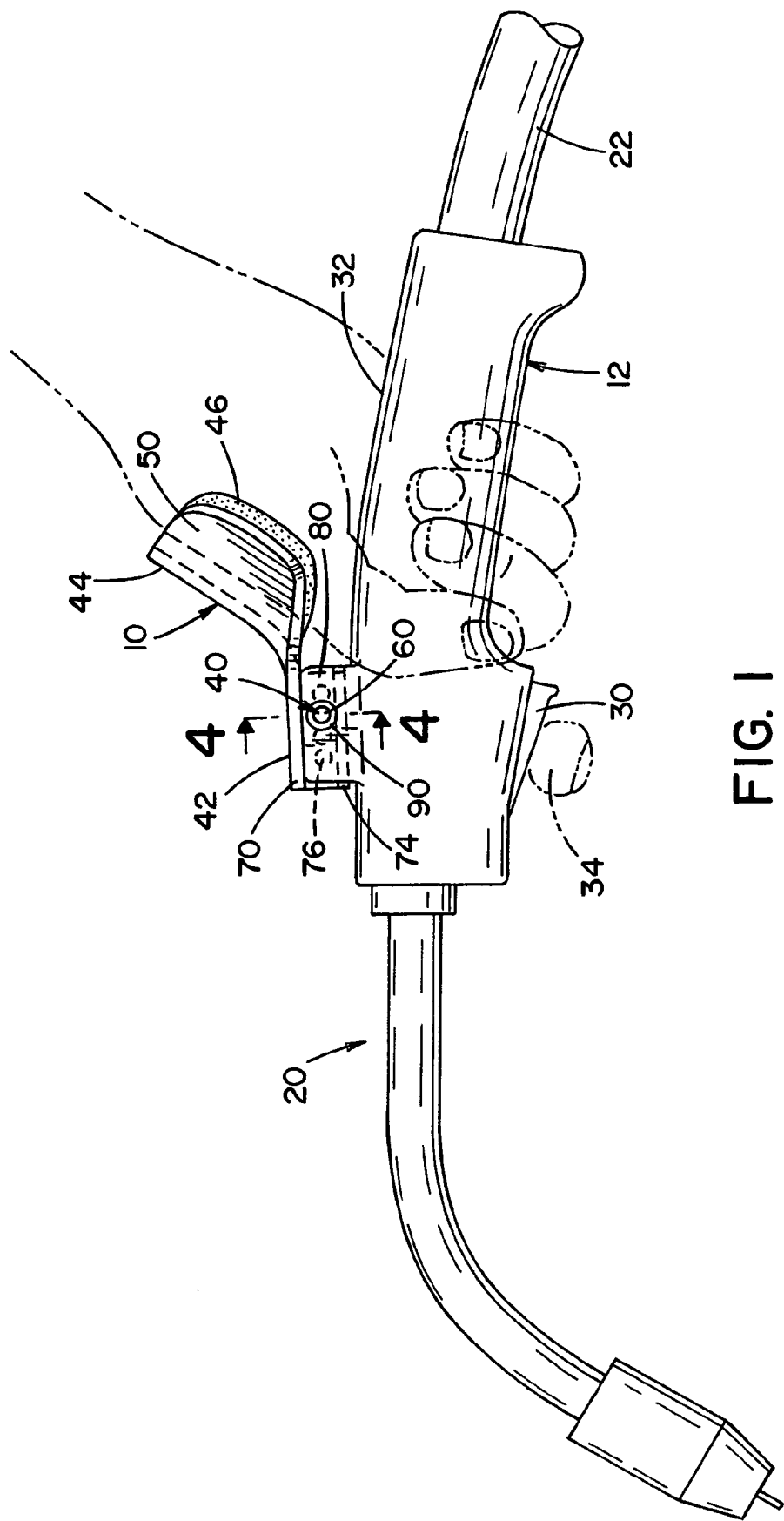
FIG. 1 is a side elevation of a welding torch with a handle-attachment in accordance with a first embodiment of the present invention.

FIG. 1 shows an ergonomic handle attachment 10, attached to a handle 12 of a MIG welding torch 20 in accordance with a first embodiment of the present invention. A service hose 22 connects the torch to the service center (not shown) that houses the electrical supply, gas supply, welding rod feed mechanism, cooling water supply and return, fume suction, etc. These items are activated by trigger 30 of the torch.

The handle 12 of the torch 20 is conventional, in itself. Conventional welding torch handles are to some extent ergonomically shaped. The top surface of the handle can be curved, as shown at 32, to fit the hollow of the palm of the hand. The handle is designed so that a forefinger 34 falls naturally onto the trigger. The handle can accommodate both left-handed and right-handed welders.

As shown in FIG. 1, an ergonomic handle attachment, or over-handle 10 is attached onto the front end of the handle 12. The over-handle 10 overlies the area of the welder's hand between the thumb and the forefinger. This area of the hand is known as the first web area. In this area, the first dorsal inteross muscle runs from the base of the thumb to the forefinger, while the adductor pollicis muscle pulls the other way, i.e. from the base of the forefinger onto the thumb.

When the over-handle 10 is present, the welder holds the handle 12 of the torch in the normal way, i.e., with the palm of the hand lying along the top of the handle, the thumb to one side, and the fingers underneath. The over-handle allows the first web area to be engaged between the over-handle and the handle. (FIG. 1 shows the welder's bare hand, for clarity: of course, welders normally wear thick protective gauntlets, gloves or the like.)

It is recognized that the above-mentioned muscles in the first web area are substantially not inhibited in their normal functioning, even over a period of several hours at a time, by the presence of the over-handle 10. The over-handle can be so shaped and positioned that the welder can manipulate and manhandle the torch 20, with the hose 22 attached, without exerting any muscular squeeze or grip on the torch handle 12. That is to say, the fingers and thumb of the torch hand can be actually held clear of the torch, and yet still the first web area of the hand is sufficiently securely held to the torch as to permit the required precision and security of movement control of the torch as is needed in the welding operation. As a result, the welder can more or less completely relax his encircling grip on the torch.

It should be noted, however, that the present invention is aimed at reducing the need for the welder to grip the handle, not at eliminating that need completely. Of course, the welder still needs to have his fingers present in an encircling configuration on the torch handle, to operate the trigger 30. The over-handle reduces the need to squeeze-grip the torch handle with one's fingers.

The over-handle can be attached as an accessory to an existing torch handle. The over-handle may be simply clamped around the handle. Or, as shown in FIG. 1, the over-handle may be secured to the torch handle via locking members or pins 40.

Extending from the fixing or attachment area 42 of the over-handle is a hand-grip area 44. This area is curved slightly, to follow the general shape of the first web area of the hand. The (concave) inside-facing surface of the hand-grip area can have a foam-rubber cushion 46, for extra comfort, and for a little extra grip, but the cushion is not required.

Figure 2:
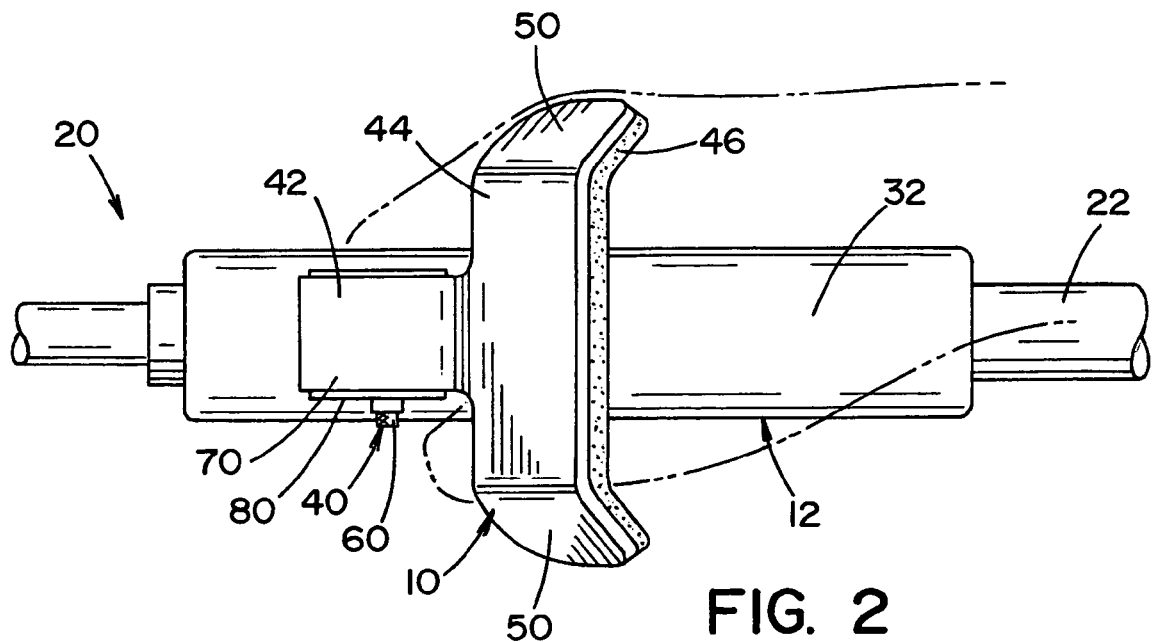
FIG. 2 is a top plan view of the welding torch of FIG. 1.
Figure 3:
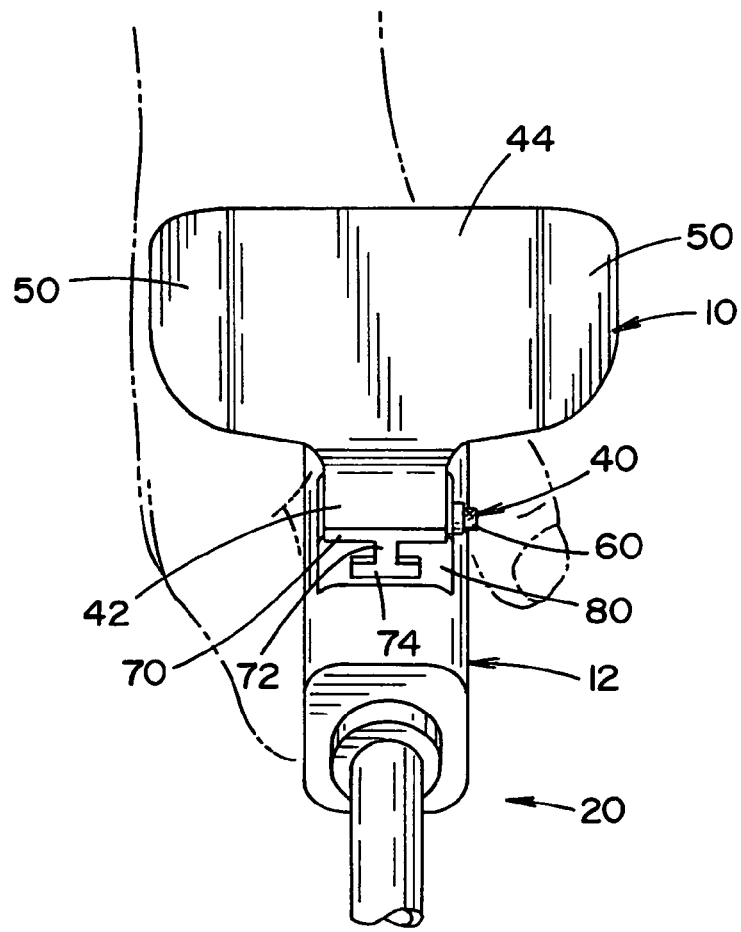
FIG. 3 is a front elevational view of the welding torch of FIG. 1.

Referring now to FIGS. 2 and 3, side cheeks 50 are provided on opposite sides of the hand-grip area, which curve downwards rather more steeply than the gentle curvature of the central portion of the hand-grip area. The cheeks 50 can be about 2.5 inches or so apart. The cheeks 50 serve to encase the welder's hand laterally to some extent. This lateral restraint is useful, in that it adds to the main restraint function of the over-handle, i.e. of squeezing the first web area between the over-handle and the top surfaces of the torch handle.

The term squeezing is used to mean that the first web area of the welder's hand is subjected to a slight compression. It is recognized, in the invention, that the first web area is able to be squeezed, in this sense, with enough force to make a large contribution to elimination of the need to grip the torch handle, but at the same time the squeeze force is small enough to cause substantially no discomfort, and virtually no interference with the normal movements of the hand. The squeezing of the first web area between the over-handle and the torch handle is almost imperceptibly gentle when compared with the extent to which a welder would have to grip the torch handle if the over-handle was not present.

The torch, with the over-handle attached, creates a squeeze grip for the first web area of the welder's hand which is considerably strong, mainly because the squeeze-grip is applied as a uniform light pressure over what amounts to quite a large area of the hand. Unless the over-handle is mis-sized for the particular welder's hand the squeeze-grip is secure enough that the welder can even hold the torch vertically, i.e. tip down, and still not need to exert any encircling grip on the handle with his muscles.

It is preferable to make the over-handle adjustable in a longitudinal direction so that the welder can grip the handle in various positions along the handle and various sizes and shapes of hands can be accommodated. Adjusting the over-handle ensures a secure squeeze-grip without causing a substantial amount of discomfort to the user. FIGS. 3-6 illustrate an embodiment in which adjustability can be provided for the over-handle.

Figure 4:
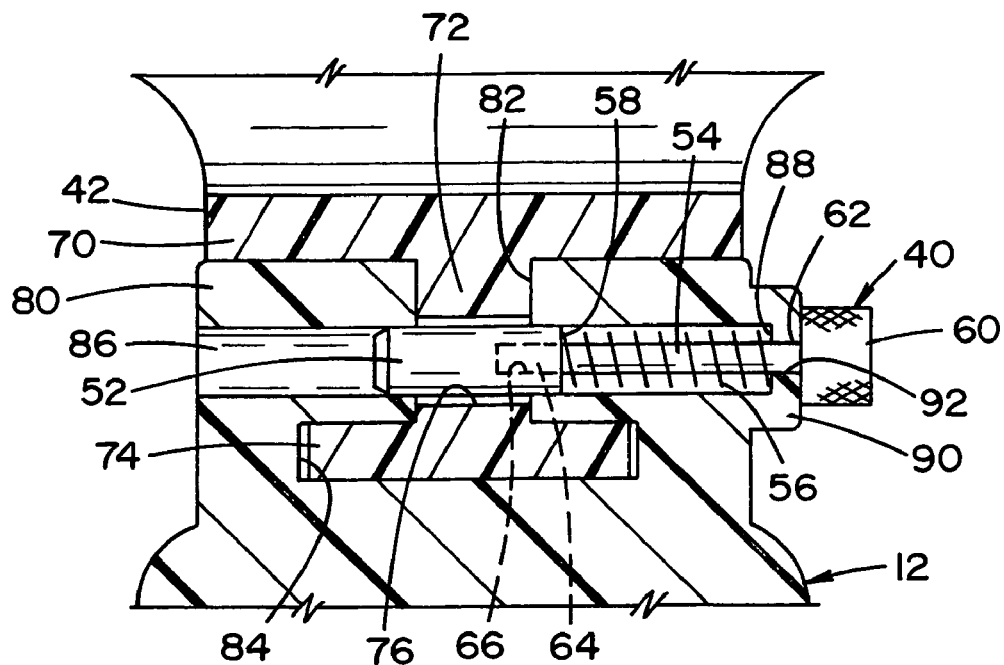
FIG. 4 is a cross-sectional view along lines 4-4 of FIG. 1.
Figure 5:
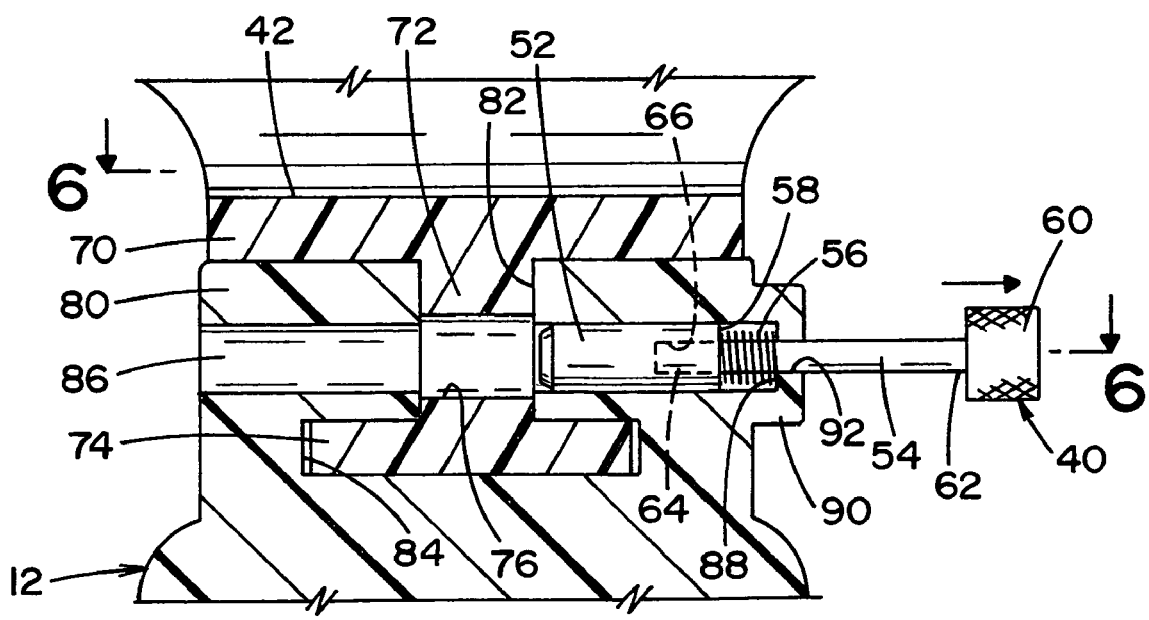
FIG. 5 is a cross-sectional view along lines 4-4 with a pin in a retracted position.

Referring now to FIGS. 4 and 5, the over-handle has attachment area 42 which includes an upper plate 70 from which the hand-grip area 44 extends. An intermediate wall 72 extends from the plate 70 and is substantially perpendicular to plate 70. A second plate 74 extends from wall 72 and is substantially perpendicular to wall 72 and substantially parallel to plate 70. Wall 72 and plate 74 form a substantially T-shaped conformation. Plates 70 and 74 are shown to each have the same thickness; however, various thicknesses of plates can be use without departing from the scope of the invention. Referring to FIG. 2, plate 70 is shown to have a rectangular shape; however, other shapes of plates are contemplated to be within the scope of the invention.

Figure 6:
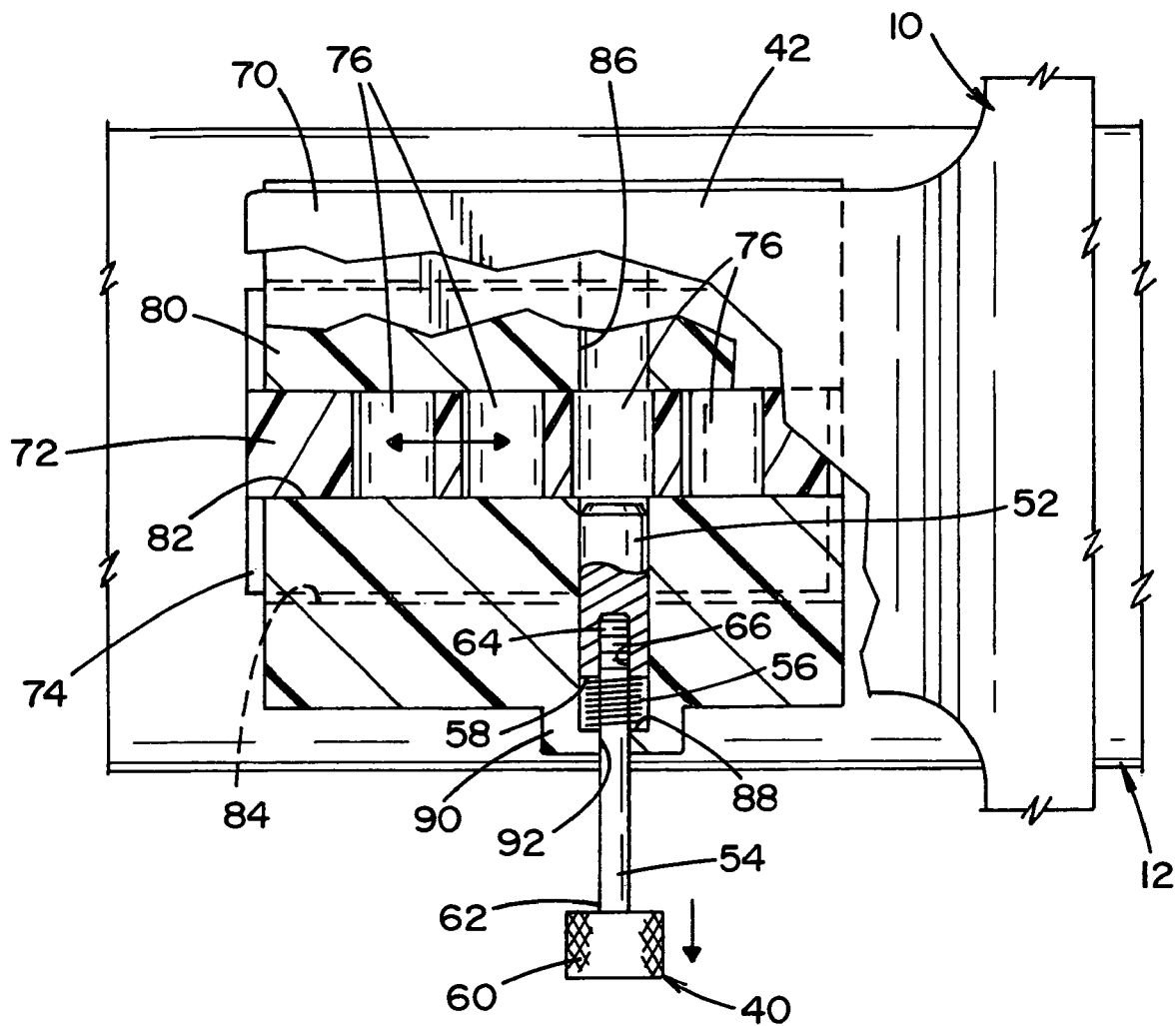
FIG. 6 is a cross-sectional view along lines 6-6 of FIG. 5.

As seen in FIG. 6, wall 72 has a plurality of openings or apertures 76 for selectively receiving a first portion 52 of pin 40. These apertures extend completely through the wall 72 and can be equally or unequally spaced apart. The apertures can be circular or another shape to accommodate various shapes of pins 40.

Plate 70 is positioned above and is seated on a top surface of an attachment portion 80 which extends from the handle 12. Referring to FIG. 6, wall 72 is slidably received in an opening 82 in portion 80 which extends along a longitudinal axis of portion 80. Referring to FIG. 4, plate 74 is slidably received in opening 84 which extends from opening 82 and also extends along the longitudinal axis of the portion 80.

Referring to FIGS. 4-6, to enable the over-handle to be adjustable along a longitudinal direction, a locking assembly in the form of a spring biased pin arrangement is used. As seen in FIG. 4, locking member assembly 40 includes a pin with a first portion 52 and a second portion 54, where the first portion has a larger diameter than the second portion. A compression spring 56 is interposed between an end 58 of the first portion and a third portion 60 which is secured on an end 62 of the second portion. The third portion can be a handle which is knurled to facilitate gripping and pulling of the pin out of the over-handle attachment. The third portion has a diameter larger than a diameter of openings 86 and 76. The second portion can be installed onto the first portion by inserting an end 64 of the second portion into a bore 66 in a wall of the first portion. The bore can be threaded or any other arrangement can be used to secure the first portion and second portion together. Similarly, the third portion can be secured to the second portion by inserting end 62 of the second portion into a bore in a wall of third portion 60. The bore can be threaded or any other suitable arrangement can be used to secure the second portion and third portion together.

Referring to FIG. 4, attachment portion 80 further has an opening 86 which extends laterally across portion 80 and selectively receives first portion 52 and second portion 54 of pin 40. The diameter of opening 76 is shown to be slightly greater than the diameter of opening 86 to account for slight misalignment between the openings. The opening 86 has a shoulder or edge 88 formed at end 90 which also has a smaller opening 92 which selectively receives second portion 54 of the pin assembly. Spring 56 is captured between end 58 of the first portion and edge 88 of the attachment portion 80. The spring biases the first pin portion 52 in an extended position in opening 86 of portion 80 and opening 76 of plate 72.

Thus, to adjust the over-handle attachment in a longitudinal direction, pin handle 60 is pulled so that the pin slides through opening 86 and opening 76 and out of engagement with opening 76 of the over-handle. Spring 56 is compressed in this configuration as seen in FIG. 5. Then, the over-handle is slid in a longitudinal direction so that the opening 76 in plate 72 is out of alignment with opening 86 of portion 80, and the first portion 52, until another opening 76 in the handle is aligned with both the opening 86 and the pin. The pin handle 60 is released, thus allowing the spring to extend and the first portion 52 to extend through opening 76 and into opening 86, as seen in FIG. 4. This locks the over-handle into a particular position with respect to the torch handle.

Figure 7:
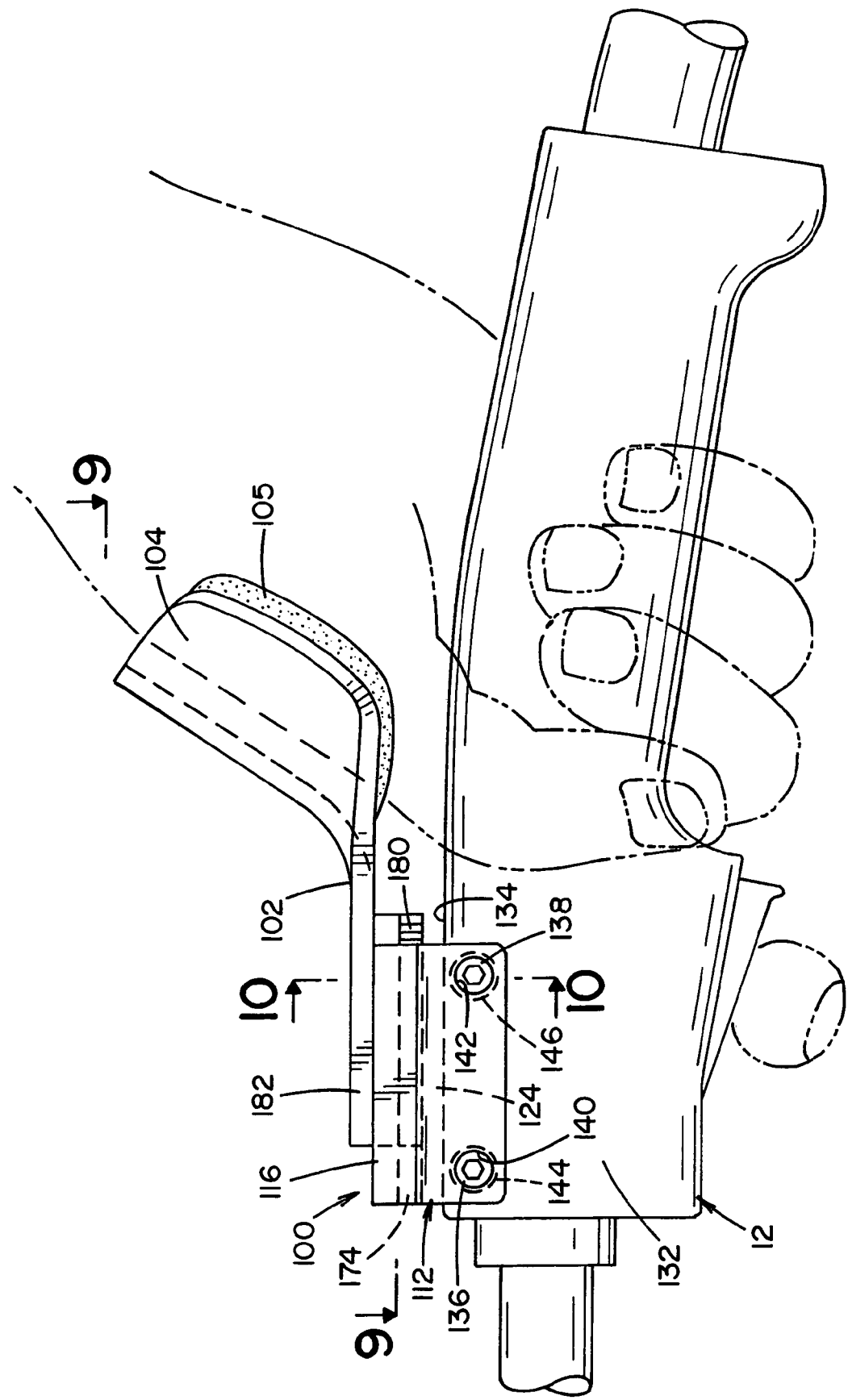
FIG. 7 is a side elevational view of an ergonomic handle attachment for a welding torch in accordance with a second embodiment of the invention.

Referring now to FIGS. 7-12, a second embodiment of the handle locking mechanism is shown. As seen in FIG. 7, extending from a fixing or attachment area 100 of the handle locking mechanism or overhandle is a hand-grip area 102. This area is curved slightly, to follow the general shape of the first web area of the hand.

Figure 9:
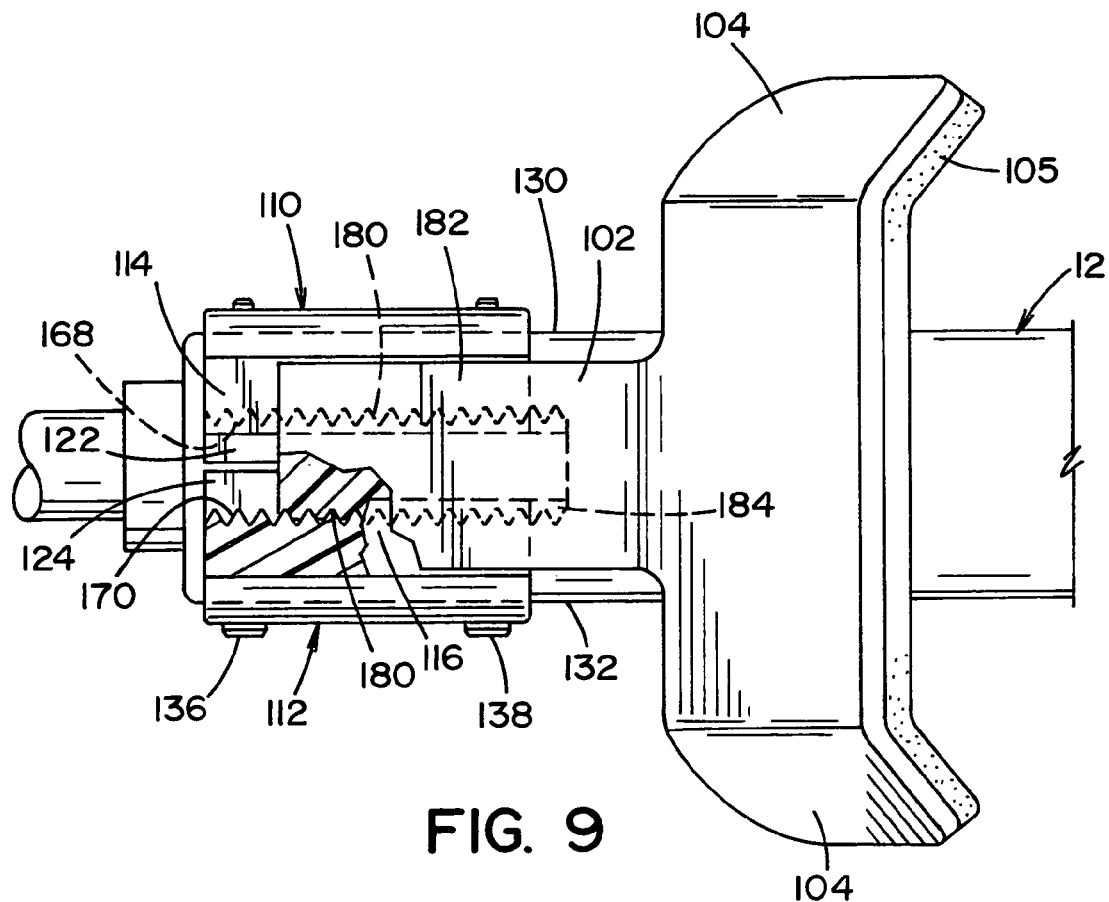
FIG. 9 is a top plan view, in partial cross section, taken along line 9-9 of FIG. 7.

Referring now to FIGS. 7 and 9, side cheeks 104 are provided on opposite sides of the hand-grip area, which curve downwards rather more steeply than the gentle curvature of the central portion of the hand-grip area. The cheeks 104 can be about 2.5 inches or so apart. The cheeks 104 serve to encase the welder's hand laterally to some extent. This lateral restraint is useful, in that it adds to the main restraint function of the over-handle, i.e. of squeezing the first web area between the over-handle and the top surface of the torch handle. Cushions 105 may be provided on the cheeks to provide padding to the hand grip position.

The torch, with the over-handle attached, creates a squeeze grip for the first web area of the welder's hand which is considerably strong, mainly because the squeeze-grip is applied as a uniform light pressure over what amounts to quite a large area of the hand. Unless the over-handle is mis-sized for the particular welder's hand, the squeeze-grip is secure enough that the welder can even hold the torch vertically, i.e. tip down, and still not need to exert any encircling grip on the handle with his muscles.

An alternate way to adjust the over-handle in a longitudinal direction so that the welder can grip the handle in various positions along the handle and various sizes and shapes of hands can be accommodated is shown in FIGS. 7-12. Adjusting the over-handle ensures a secure squeeze-grip without causing a substantial amount of discomfort to the user.

Figure 8:
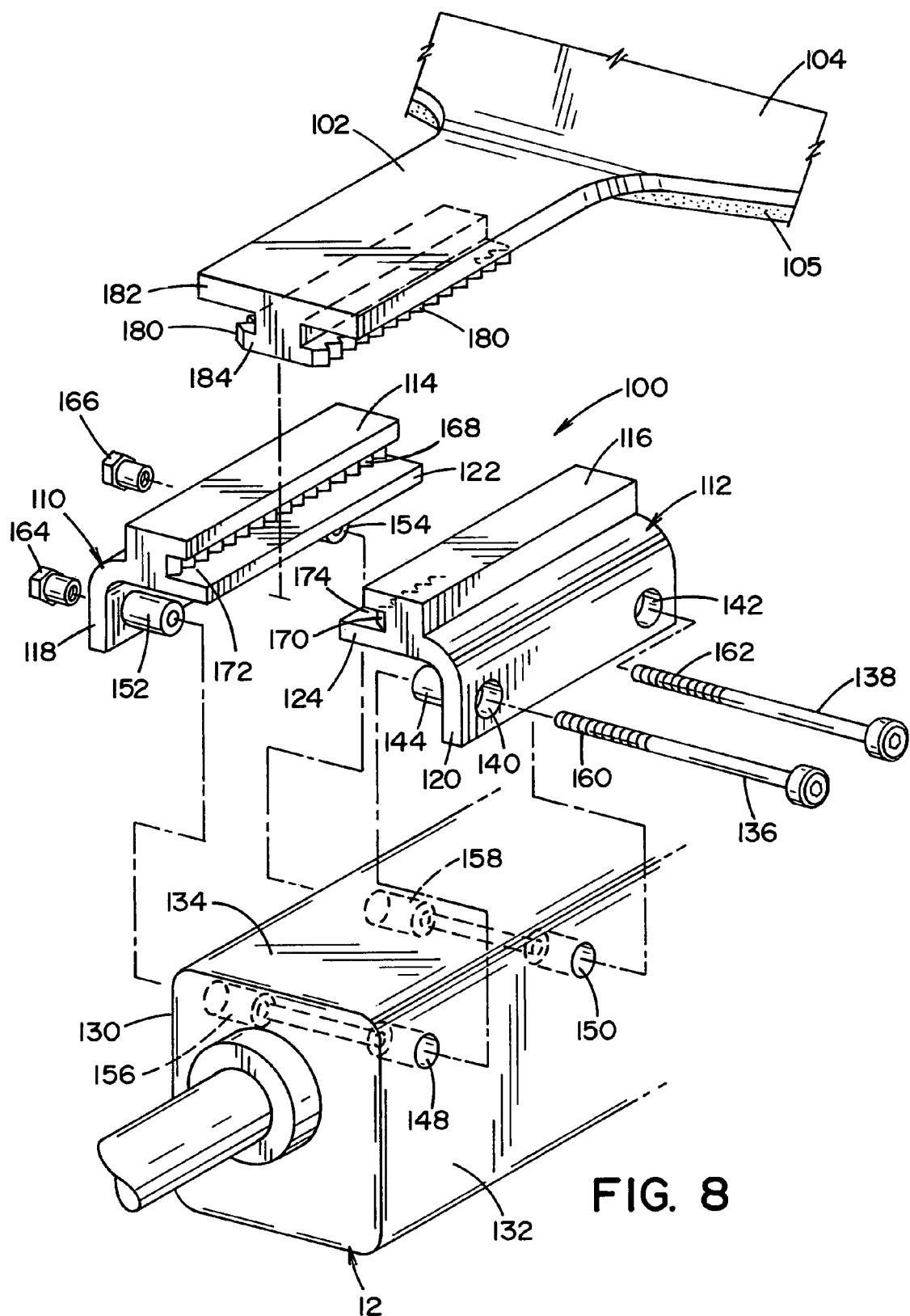
FIG. 8 is an exploded perspective view of the ergonomic handle attachment of FIG. 7.

Referring to FIG. 8, the over-handle attachment area 100 includes a pair of substantially L-shaped elongated bars 110, 112 which are essentially mirror-images of each other. Each bar has an upper wall 114, 116, a side wall 118, 120 extending downwardly from the upper wall and an intermediate wall 122, 124 extending below upper walls 114, 116, respectively. The intermediate walls can be substantially parallel to the upper walls. The bars 110, 112 are mounted on opposing side walls 130, 132 of the housing of handle 12. Side walls 118, 120 are shown to have curved or rounded edges; however, straight edges can also be used.

Figure 10:
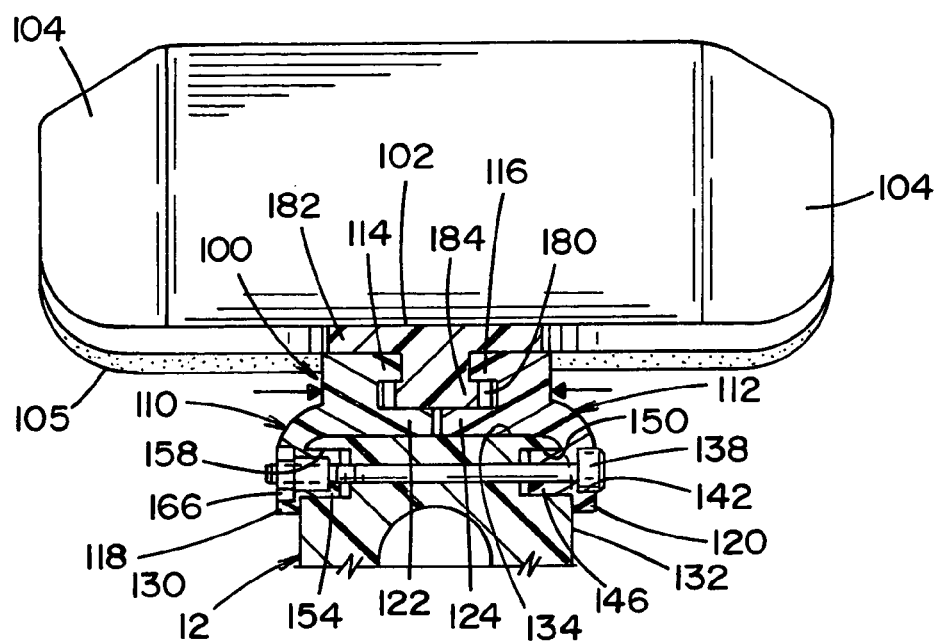
FIG. 10 is a cross-sectional elevational view, taken along line 10-10 of FIG. 7.

As can be seen in FIG. 10, intermediate walls 122, 124 are seated on upper surface 134 of the handle. Side walls 118, 120 are positioned adjacent side walls 130, 132 of the handle and are secured to the side walls via elongated fasteners 136, 138. Referring again to FIG. 8, fasteners 136, 138 are inserted into openings 140, 142 in side wall 120 of the bar 112 and through openings in cylinders or dowels 144, 146 extending from an opposite side of side wall 132.

Cylinders 144, 146 are inserted into corresponding mating openings 148, 150 in handle side wall 132. Similarly, cylinders 152, 154 extend from side wall 118 of bar 110 and are inserted into mating openings 156, 158 of wall 130.

Fasteners 136, 138 are inserted into cylinders 144, 146 and through openings 148, 150. The fasteners then extend through the inside cavity of the handle housing to openings in cylinders 152, 154 and into openings 156, 158 in handle side wall 130. Threaded portions 160, 162 of the fasteners extend through openings 156, 158 and are secured into place by retaining members such as threaded nuts 164, 166 adjacent side wall 130.

Interposed between the upper wall and intermediate walls of the bars are a plurality of serrated edges or teeth 168, 170 as seen in FIG. 8. The teeth extend along a longitudinal axis of each bar and are formed in channels 172, 174 formed by walls 114, 122 and 116, 124. The teeth are configured to interengage with teeth 180 which are formed on overhandle grip area 102. Specifically, the grip area 102 has a plate or wall 182 which extends from the cheeks 104 and is substantially rectangular in configuration. A second plate or wall 184 extends from and below the wall 182 along a longitudinal direction. Teeth or serrated edges 180 extend along a longitudinal axis of wall 182 on opposite sides of the wall. During use, the grip portion 102 is slid between bars 110, 112 such that wall 184 is interposed between walls 114, 116 and 118, 120 and within channels 172, 174. Teeth 180 interengage with teeth 168, 170 and lock the grip portion from moving with respect to the attachment portion, as seen in FIG. 9.

Figure 11:
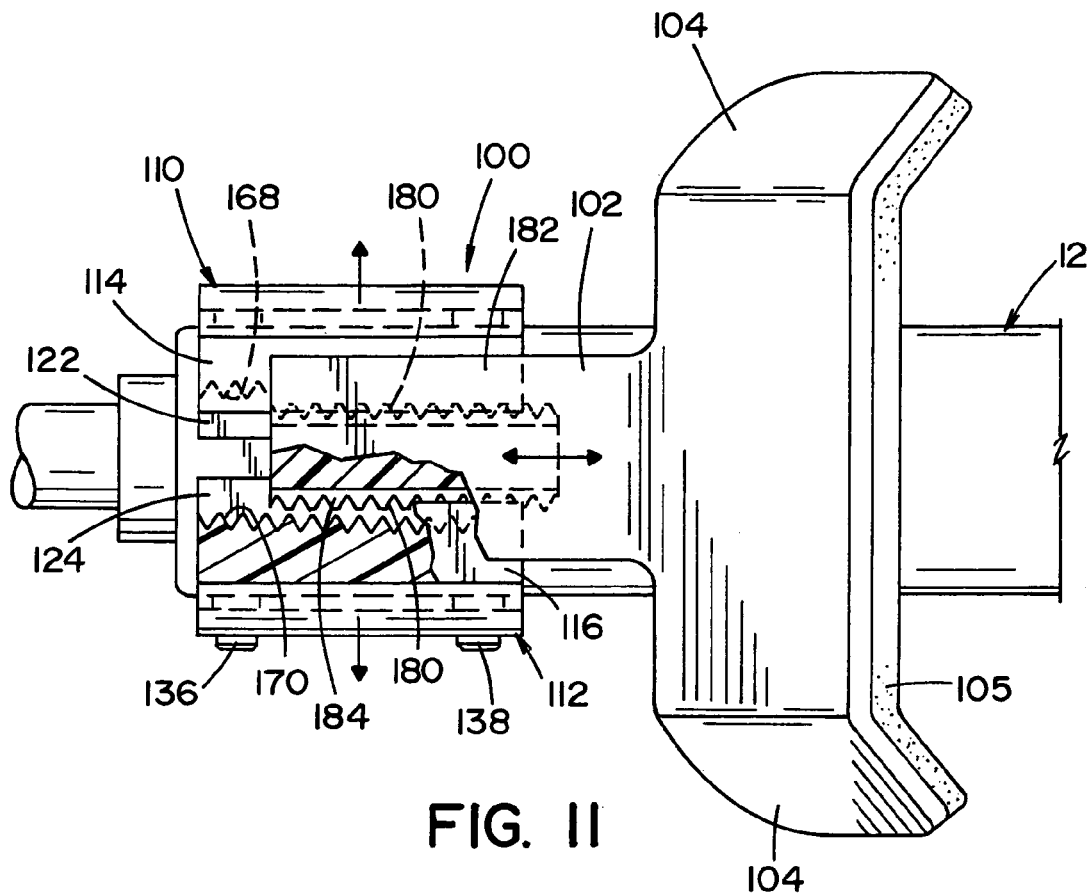
FIG. 11 is a top plan view, in partial cross-section, of the handle attachment of FIG. 7; and, FIG. 12 is a front elevational view, in partial cross section, illustrating the handle attachment of FIG. 7.
Figure 12:
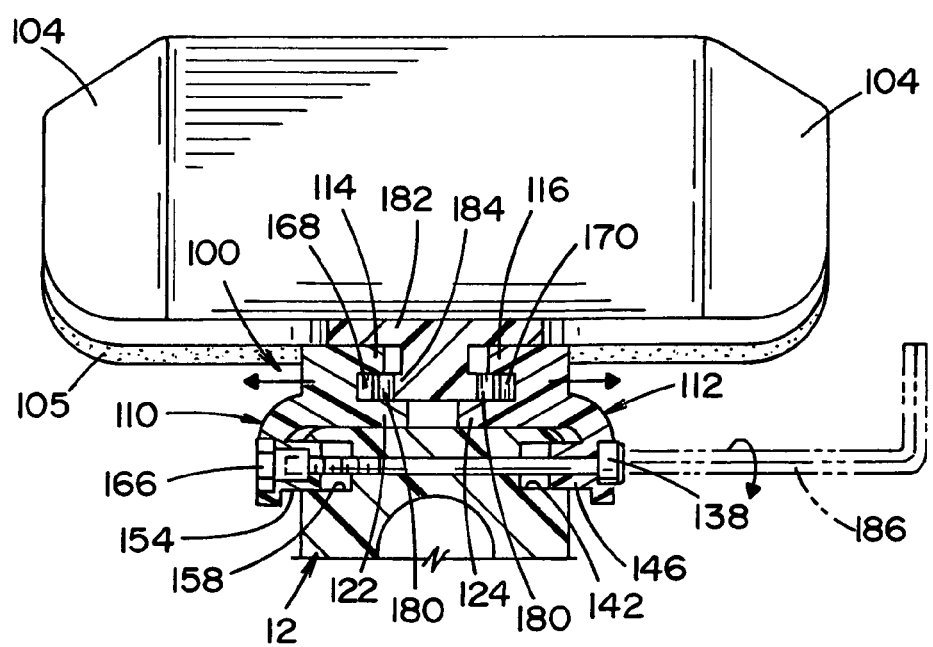

To adjust the position of the grip portion with respect to the adjustment portion, the fasteners 136, 138 are loosened or backed out of the holes by being unthreaded out such as by a key 186 being rotated counterclockwise such as shown in FIG. 12. When the fasteners are loosened, the two side bars 110, 112 can be separated from each other in the direction of the arrows in FIG. 12. Then, the two bars are manually pulled apart a sufficient amount so that the teeth 180 of the grip portion disengage the teeth 168, 170 on each of the side bars. Then, the grip portion 102 can be slid along a longitudinal axis of the attachment portion 100 in either direction, as shown in FIG. 11. When a desired portion of the grip portion is reached, the fasteners 136, 138 are re-inserted through the openings and are threaded into a locked position, as shown in FIGS. 9 and 10. Then, the grip portion is secured in a locked position with respect to the attachment position.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. An ergonomic over-handle attachment in combination with a welding torch handle, wherein said over-handle attachment comprises:
   a first attachment member attached to said torch handle at a first side wall of said torch handle, wherein said first attachment member comprises serrated edges formed along a longitudinal axis on an outer wall of said first attachment member;
   a second attachment member attached to said torch handle at a second side wall of said torch handle, wherein said second attachment member comprises serrated edges formed along a longitudinal axis on an outer wall of said second attachment;
   a hand-grip portion extending rearwardly from said first and second attachment members wherein said first and second attachment members are connected together such that said serrated edges of said first attachment member face said serrated edges of said second attachment member; and
   a locking portion slidably positioned between said first and second attachment members along said longitudinal axis of said first and second attachment members, said locking member comprising a wall having serrated edges thereon which matingly engage corresponding serrated edges formed on opposing walls of said first and second attachment members.

2. The over-handle attachment of claim 1, wherein said hand-grip portion is oriented in a position spaced apart from said handle.

3. The over-handle attachment of claim 1, wherein said hand-grip portion and said handle form a space therebetween sized and shaped to selectively receive a web area of a hand of a person between the person's thumb and forefinger.

4. The over-handle attachment of claim 3, wherein said over-handle attachment is configured so that said first and second attachment members are positioned in front of said web area of said hand of said person.

5. The over-handle attachment of claim 4, wherein the space created by the handle and the hand-grip portion is configured such that when the web area of the hand is gripped between the handle and the hand-grip portion to allow the person to manipulate and use an associated torch.

6. The over-handle attachment of claim 4, wherein the configuration of the over-handle attachment is such that when said web area of said hand is located in said space, said first and second attachment members lie between a thumb and a forefinger of said hand.

* * * * *